(12) United States Patent
Battaglia et al.

(10) Patent No.: US 11,733,999 B2
(45) Date of Patent: *Aug. 22, 2023

(54) VERSIONING AND CATALOGING APPLICATION PROGRAMMING INTERFACE (API) SPECIFICATIONS

(71) Applicant: salesforce.com, inc., San Francisco, CA (US)

(72) Inventors: Martin Battaglia, Buenos Aires (AR); Leandro Bauret, Buenos Aires (AR); Roberto Ciccone, Buenos Aires (AR); Marcos Khabie, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/589,256

(22) Filed: Jan. 31, 2022

(65) Prior Publication Data
US 2023/0093370 A1    Mar. 23, 2023

Related U.S. Application Data

(60) Provisional application No. 63/246,061, filed on Sep. 20, 2021.

(51) Int. Cl.
*G06F 8/71*   (2018.01)
*G06F 9/54*   (2006.01)
*G06F 8/65*   (2018.01)

(52) U.S. Cl.
CPC .............. *G06F 8/71* (2013.01); *G06F 8/65* (2013.01); *G06F 9/541* (2013.01)

(58) Field of Classification Search
None
See application file for complete search history.

(56) References Cited

U.S. PATENT DOCUMENTS

| 9,235,409 | B1 * | 1/2016 | Guo | G06F 8/65 |
| 11,281,462 | B1 * | 3/2022 | Manzano | G06F 8/10 |
| 11,360,993 | B1 * | 6/2022 | Prasad | G06F 9/541 |

(Continued)

*Primary Examiner* — Philip Wang
*Assistant Examiner* — Rongfa P Wang
(74) *Attorney, Agent, or Firm* — Sterne, Kessler, Goldstein & Fox P.L.L.C.

(57) ABSTRACT

Disclosed herein are system, method, and computer program product embodiments for automatically cataloging updated Application Programming Interface (API) specifications with updated version numbers. The API specifications may have been previously published to an application exchange platform. An automatic cataloging tool installed at an API development system may identify an updated API specification committed to an API specification repository. The automatic cataloging tool may identify a base API specification that has been previously published and confirm that a change has been made. The base API specification may correspond to a particular API development branch that has been updated. The automatic cataloging tool may also apply a versioning strategy to automatically determine an updated version number for the updated API specification. The application exchange platform may then replace the previous API specification with the updated API specification and the updated version number.

20 Claims, 6 Drawing Sheets

(56) References Cited

U.S. PATENT DOCUMENTS

| | | | |
|---|---|---|---|
| 11,630,664 B2* | 4/2023 | Manzano | G06F 9/547 |
| | | | 717/101 |
| 2017/0337052 A1* | 11/2017 | Elkabany | G06F 8/71 |
| 2019/0384650 A1* | 12/2019 | Danielsson | G06F 8/65 |
| 2023/0086564 A1* | 3/2023 | Battaglia | G06F 9/544 |
| 2023/0092030 A1* | 3/2023 | Battaglia | G06F 8/36 |
| | | | 717/104 |
| 2023/0093004 A1* | 3/2023 | Battaglia | G06F 9/547 |

* cited by examiner

VERSIONING AND CATALOGING APPLICATION PROGRAMMING INTERFACE (API) SPECIFICATIONS

CROSS-REFERENCE TO RELATED APPLICATIONS

This application claims priority to U.S. Provisional Patent Application No. 63/246,061 filed on Sep. 20, 2021, which is incorporated by reference herein in its entirety.

BACKGROUND

Technical Field

One or more implementations relate to the field of Application Programming Interfaces (APIs); and more specifically, to the automatic versioning and cataloging of API specifications.

Background Art

As connectivity between computer and mobile devices continues to develop, applications have been developed that communicate and share information. Commonly, applications may communicate via an Application Programming Interface (API). An API is a software interface offering a service to other programs to communicate data. To describe or standardize the communication protocol for an API, API developers provide an API specification. The API specification details how to use or interface with an API for communication. For example, the API specification may define API objects, values and parameters, how the API objects are called, and what each object does. The API specification may also indicate relationships between the objects and how each object can be used. A computer system that utilizes this specification is said to implement or expose an API.

As APIs continue to be developed and utilized, many large enterprise organizations may develop or implement dozens or even hundreds of APIs. These APIs may exist at varying stages of an API development lifecycle. For example, some APIs may have been publically released and implemented by customers or consumers; some APIs may be released as a test build or beta; and other may be still in internal testing or development. In some cases, multiple versions of an API may concurrently exist and be implemented for different applications. For the APIs that have been released, developers may continue updating or patching APIs with newer versions. While new API implementation code may be released, developers may neglect the maintenance of updating public API documentation, such as the API specification. The organizations may also face difficulties managing the versions or version numbers for updated API specifications. This may lead to inconsistencies between a public API specification and an API implementation. For example, organizations that are managing or updating multiple APIs that are in public use or that have been published to an application exchange may face difficulties cataloging updated API specifications, determining updated version numbers, and distinguishing updated API specifications from updated API implementations.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
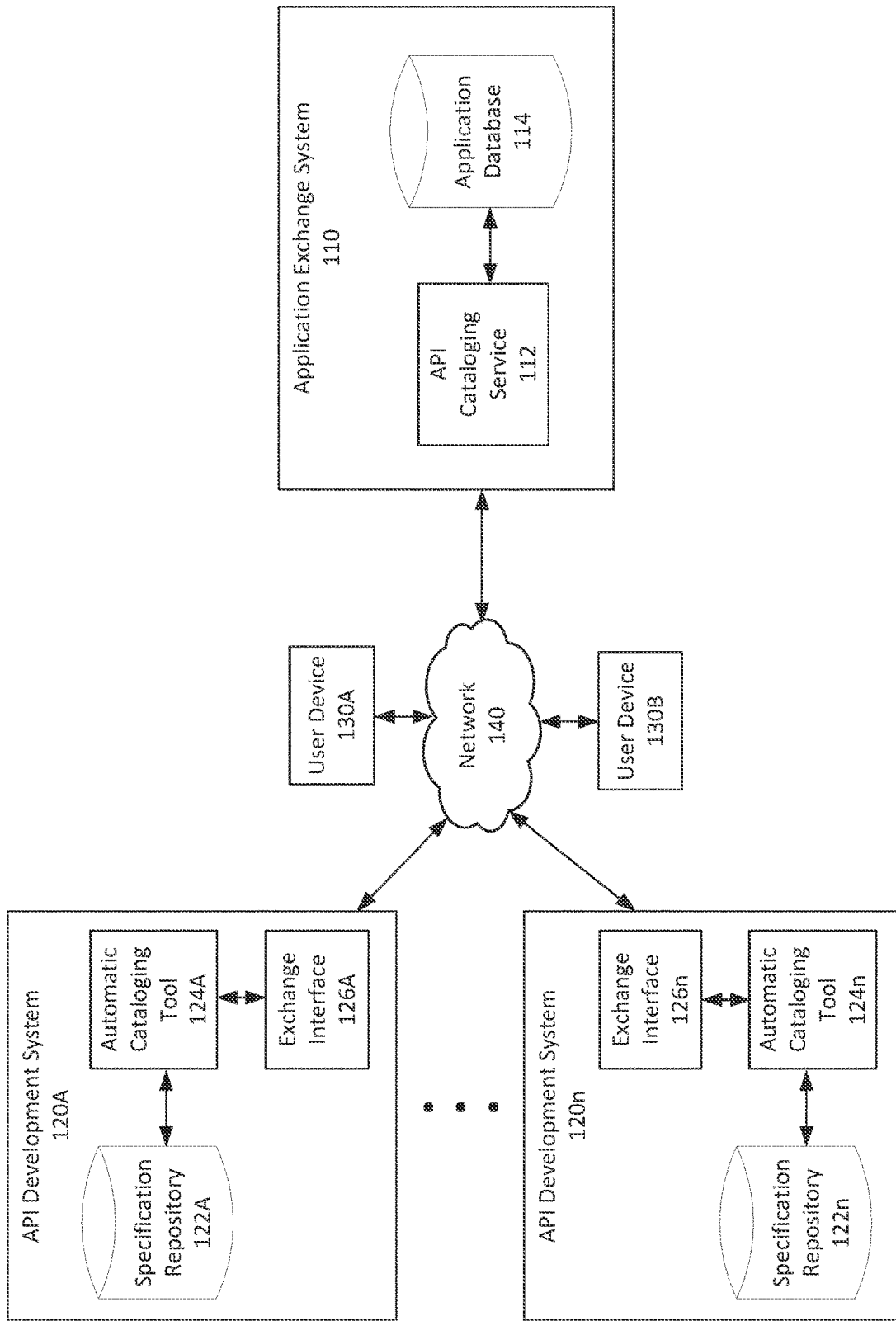
FIG. 1 depicts a block diagram of an Application Programming Interface (API) specification cataloging environment, according to some embodiments.

Provided herein are system, apparatus, device, method and/or computer program product embodiments, and/or combinations and sub-combinations thereof, for automatically cataloging Application Programming Interface (API) specifications with version numbers.

In some embodiments, an API development system implements an automatic cataloging tool to validate and catalog API specifications with corresponding version numbers. The automatic cataloging tool may be implemented using a command line interface (CLI) and/or an application service. The validation and cataloging of API specifications may correspond to updated API specifications that have previously been published on an application exchange platform implemented on an application exchange system. The application exchange platform may be an application marketplace or online store allowing consumers to install, implement, and/or download applications, which may include services, software, extensions, and/or programs. The applications may have corresponding APIs with API specifications. The application exchange platform publishes the API specifications for viewing and/or use by consumers or implementers of the API.

The automatic cataloging tool implemented at an API development system analyzes API specifications which have been drafted and/or updated by developers. As part of this process, the automatic cataloging tool may identify changes to the API specification as distinct from changes made to an API implementation, changes made to a test version, and/or other API updates not intended to be committed to the application exchange platform. When identifying a changed API specification, the automatic cataloging tool may be configured to ignore these other processes. Instead, the automatic cataloging tool may identify the changes to an updated API specification. The automatic cataloging tool may then identify a corresponding API specification version corresponding to the update.

As part of the process for identifying the version to update, the automatic cataloging tool identifies a base API specification. This base API specification may be an API specification to be incremented based on the updated API specification. The identification of the base API specification may aid in cases where multiple versions of an API with corresponding API specifications are published an in use. For example, a legacy version of an API, such as an API version 1.0.0, may still be supported and/or updated while a newer version of the API, such as an API version 2.0.0, has also been released and is also supported. In some embodiments, different API versions may represent a stable build versus a beta build, such as a version 1.2.0 versus a version 1.2.1. In this case, when an updated API specification is detected, automatic cataloging tool identifies the appropriate base API specification to increment and/or update when publishing the updated API specification to the application exchange platform. To determine the base API specification, the automatic cataloging tool may receive an instruction file from a developer in using a wildcard syntax. The developer may provide the instruction file as a separate file to the automatic cataloging tool and/or provide the designation within the automatic cataloging tool via an in-line specification.

The wildcard syntax may define one or more patterns for the automatic cataloging tool to use in identifying the base API specification. For example, the wildcard syntax may include wildcards as well as portions of the base API specification that are intended to match portions from the updated API specification. The wildcards provided in the instruction file may indicate non-matching portions of the base API specification. These non-matching portions may be skipped when the automatic cataloging tool searches for the base API specification. With the wildcard syntax, the automatic cataloging tool may recognize the matching portions corresponding to the desired base API specification. This may be a particular branch of API development. The automatic cataloging tool may identify an identified API specification as the base API specification. In some embodiments, the automatic cataloging tool may retrieve a latest version of the API specification within the particular API development branch matching the wildcard syntax. This may occur, for example, if multiple matching API specifications are identified that match the wildcard syntax.

In some embodiments, the automatic cataloging tool may compare the updated API specification to the base API specification to confirm whether a change has actually been made. This comparison allows the automatic cataloging tool to distinguish changes to an API specification versus changes to an API implementation. In some embodiments, the automatic cataloging tool may avoid publication when an API implementation has been changed. In this manner, the automatic cataloging tool may confirm that the API specification has changed. In some embodiments, the comparison may be made by comparing a hash value of the updated API specification to a hash value corresponding to the base API specification. The automatic cataloging tool may then determine that the updated API specification differs from the base API specification.

In addition to confirming the update, the automatic cataloging tool may also determine an updated version number corresponding to the updated API specification. This updated version number may be determined prior to and/or subsequently to comparing the updated API specification to the base API specification. To determine the updated version number, the automatic cataloging tool may utilize a versioning strategy and/or versioning rules. For example, an updated version number may be an incremental value relative to a version number of the base API specification. The automatic cataloging tool may determine how to increment the version number based on versioning rules. For example, a developer providing the updated API specification may specify and/or designate the type of update being submitted. Categories of updates may include a patch update, a minor update, and/or a major update. The automatic cataloging tool may identify this type of update designated and generate a corresponding updated version number by incrementing a corresponding digit.

For example, if the base API specification has a version number of 1.0.3 and the updated API specification is designated as a patch, the automatic cataloging tool may increment the third digit to generate an updated version number of 1.0.4. In another example, if a major update is designated, the automatic cataloging tool may increment the first digit to generate an updated version number of 2.0.0.

In some embodiments, the automatic cataloging tool may use a semantic analysis to determine the updated version number. In this case, the updated version number may depend on the type of changes introduced to the API specification. For example, if the change renders the previous API implementation unusable or breaks the API implementation, such as when an existing endpoint is removed, then the version number may correspond to a major update. In this manner, the semantic analysis may determine an update version number based on a degree of change and/or a severity of change.

As will be further explained below, the automatic cataloging tool may determine the base API specification that has been published, determine that an updated API specification differs from the base API specification, and determine an updated version number corresponding to the updated API specification. Implementing the automatic cataloging tool may provide a process for efficiently publishing updated API specifications and determining corresponding version numbers. For example, an API specification and other corresponding documents may be divided and/or stored in multiple different repositories by an API development system. The automatic cataloging tool may automatically identify the relevant files and/or documents corresponding to an API specification. The automatic cataloging tool may also identify changes to an API specification while avoiding a triggering of the publication process when an API implementation is changed or a change is committed to a test branch. The automatic cataloging tool is also able to automatically determine a corresponding version number based on a configured versioning scheme. This may aid when managing multiple branches of API development and/or when multiple API versions are live with different development lifecycles. In this manner, the automatic cataloging tool more efficiently manages updated API specification files and data in computer systems and/or enterprise computer systems. The automatic cataloging tool additionally more efficiently manages the versioning of the updated API specifications and management of different API development branches and lifecycles.

Additionally, implementing the automatic cataloging tool in a development pipeline provides continuous integration and continuous deployment (CI/CD) of updated API implementations. As developers continue to update API implementations or release new versions, the automatic cataloging tool may continue to publish updated API specifications with corresponding version numbers. These may corresponding to different API branches and/or lifecycles. By implementing the automatic cataloging tool, API development systems may streamline the deployment and publication of new API versions. Further, implementing the automatic cataloging tool allows developers to focus on building and implementing APIs. This automation and self-discovery of updated API specifications along with updated version numbers may reduce wasted computer resources corresponding to developer intervention.

Various embodiments of these features will now be discussed with respect to the corresponding figures.

FIG. 1 depicts a block diagram of an Application Programming Interface (API) specification cataloging environment 100, according to some embodiments. API specification cataloging environment 100 includes application exchange system 110, API development systems 120, user device 130, and/or network 140.

Application exchange system 110 may be implemented using computer system 500 as further described with reference to FIG. 5. For example, application exchange system 110 may be implemented using one or more servers and/or databases. Application exchange system 110 may communicate with user devices 130 and/or API development systems 120 over network 140. Network 140 may include any combination of Local Area Networks (LANs), Wide Area Networks (WANs), and/or the Internet.

Application exchange system 110 may provide an application exchange platform. The application exchange platform may be an application marketplace or online store allowing consumers to install, implement, and/or download applications, which may include services, software, extensions, and/or programs. The application exchange platform may also be a cloud-based application marketplace. This may allow users to identify applications to implement into cloud-based computing platforms. The applications may have corresponding APIs with API specifications. Application exchange system 110 publishes the API specifications on the application exchange platform for viewing and/or use by consumers or implementers of the API. These may also include corresponding version numbers.

The consumers or implementers may use a user device 130 to access application exchange system 110 via network 140. User device 130 may be a desktop personal computer, workstation, laptop, Personal Digital Assistant (PDA), smartphone, smartwatch, wearable device, augmented reality (AR) device, virtual reality (VR) device, and/or computer system 500. Using user device 130, users may access application exchange system 110 to view or browse applications, APIs, and/or API specifications. Application exchange system 110 may generate one or more graphical user interfaces (GUIs) for display on user device 130 to display data corresponding to the applications, APIs, and/or API specifications. Application exchange system 110 may store this data in application database 114. When a user device 130 accesses application exchange system 110, API specification data may be retrieved from application database 114, formatted, and transmitted to user device 130 for viewing. User device 130 may also install, implement, and/or download applications via the GUIs. The applications may utilize the APIs corresponding to the API specifications.

To receive and/or store API specifications and/or updated API specifications, application exchange system 110 includes an API cataloging service 112. API cataloging service 112 receives updated API specifications from API development systems 120. API cataloging service 112 stores the updated API specifications in application database 114. In some embodiments, API cataloging service 112 may be a messaging interface configured to exchange messages and/or data packets with API development system 120. In some embodiments, API cataloging service 112 may be an API utilized by an API development system 120 to provide the updated API specification. API cataloging service 112 may also receive and/or publish corresponding version numbers for the API specifications.

One or more API development system 120 may provide updated API specifications to application exchange system 110. An API development system 120 may be a computer system, a cloud-computing system, an enterprise system, a server, and/or other computer device allowing an API developer to draft an API specification. In some embodiments, an API development system 120 may be implemented using computer system 500 as further described with reference to FIG. 5.

To provide the updated API specification, an API development system 120 may use an exchange interface 126 and/or an automatic cataloging tool 124. Exchange interface 126 may communicate with API cataloging service 112 to validate API specifications and/or to provide update API specifications and/or corresponding version numbers. In some embodiments, exchange interface 126 may also provide API implementation code as well. As previously explained, API cataloging service 112 may be a messaging interface configured to exchange messages and/or data packets with API development system 120. This may occur via exchange interface 126. In some embodiments, API cataloging service 112 may be an API utilized by an API development system 120 to provide the updated API specification. Exchange interface 126 may access and use an API provided by API cataloging service 112 to provide other API specifications.

To provide updated API specifications and/or version numbers, the exchange interface 126 may implement the automatic cataloging tool 124 previously described. The automatic cataloging tool 124 may be implemented using a command-line interface (CLI) and/or a service or program executed by the API development system 120. In some embodiments, an administrator of API development system 120 may implement the automatic cataloging tool 124 in an API development pipeline to provide continuous integration and continuous deployment (CI/CD) of updated API implementations. The administrator may be DevOps engineer and/or an administrator responsible for software development and/or IT operations.

In some embodiments, the administrator may use a descriptor file to designate APIs to be monitored and/or cataloged. The descriptor file may identify APIs and/or their corresponding API specification files stored in specification repository 122. Specification repository 122 may be one or more memory devices or databases storing elements of an API specification. In some embodiments, elements of an API specification may be stored in multiple specification repositories 122 corresponding to an API development system 120. For example, while specification repository 122A is depicted as a single memory device, specification repository 122A may be implemented as multiple memory devices storing different components or elements of an API specification. Further, different API development systems 120 may have different specification repository 122 configurations. The API specification may be divided and/or segmented into different files. The descriptor file generated at an API development system 120 may designate the one or more specification repositories 122 including the one or more API specification files.

The descriptor file may also identify metadata complementing the API and/or the API specification. This metadata may be used by application exchange system 110 to catalog and/or organize the API and/or the publication of the API specification to the application exchange platform. In some embodiments, the descriptor file and/or the API specification may include the metadata. The metadata may include, for example, tags, categories, ownership data, and/or other metadata used for cataloging and publishing the API specification. The automatic cataloging tool 124 may use this metadata when validating, cataloging, and/or publishing the API specification. In this manner, the automatic cataloging tool 124 may identify the API specifications and/or metadata specified in the descriptor file to automatically catalog the specified API specifications. In some embodiments, automatic cataloging tool 124 may apply an auto-discovery of candidate APIs.

As will be further explained below, in some embodiments, automatic cataloging tool 124 may read a comment within an API specification to recognize that the API specification has been committed for publishing. The comment may be a string of characters. The inclusion of a commit comment may indicate that a particular updated API specification is to be published. In some embodiments, an application development system 120 may use different branches for API different lifecycles. These branches may correspond to different designations for API implementations and/or specifications. For examples, different branches may include a master branch, a publication branch, test branches, and/or other branches indicating a particular part of development. Based on these branches, automatic cataloging tool 124 may also identify a particular API specification for publication. For example, these may be API specification that have been committed to a commit branch. Automatic cataloging tool 124 may ignore saved and/or committed versions of the API specification to other branches.

In some embodiments, automatic cataloging tool 124 may determine that an updated API specification should be published based on a commit from a particular user or owner. For example, automatic cataloging tool 124 may identify commits from a user and publish these committed API specifications. For example, automatic cataloging tool 124 may track user login credentials. In some embodiments, automatic cataloging tool 124 may also utilize rules specifying a particular time to commit updated API specifications. For example, automatic cataloging tool 124 may be configured to publish API specifications on particular days of the week. This may depend on or be independent from the particular owner providing the updated API specification.

In view of these different triggering conditions, automatic cataloging tool 124 may use one or more of these triggering conditions to identify dynamic rules for publishing updated API specifications. These rules may be based on the reading of a descriptor file, reading a commit comment, identifying a commit branch, identifying a commit owner, and/or identifying a particular time to commit the updated API specification. The updating of an API specification on an application exchange platform may be integrated with an existing API development pipeline to automatically validate and catalog updated API specifications. Based on one or more of the tracked triggering conditions previously described, when a developer saves and/or commits a change to the API specification as stored in specification repository 122, the automatic cataloging tool 124 validates the updated API specification in preparation for publishing.

To validate the API specification, the automatic cataloging tool 124 may analyze the metadata corresponding to an API specification and/or any additional files referenced by the API specification. For example, the metadata may designate additional documentation files, dependencies, and/or a tree of dependencies. In some embodiments, the documentation files, dependencies, and/or tree of dependencies may be referenced within the API specification. For example, the body of the API specification may refer to other files as part of the API specification. In some embodiment, documentation files may be markdown documents. If the API specification and/or the documentation files references other files, such as images, API development system 120 may store these files in specification repository 122.

The API specification may also include dependencies. The automatic cataloging tool 124 may validate these dependencies. Dependencies may refer to those files and/or data relied upon by an API specification. For example, the API specification may refer to and/or incorporate a data file. In this manner, the API specification may depend on the data file. A tree of dependencies may refer to multiple dependency files. For example, the API specification may depend on data file A, but data file A depends on data file B. The automatic cataloging tool 124 may resolve and/or retrieve these dependencies when analyzing or validating the API specification.

To validate the API specification, the automatic cataloging tool 124 may compare the updated API specification to a version of the API specification previously published by application exchange system 110. For example, the automatic cataloging tool 124 may identify the changes to the API specification, changes to any metadata, and/or changes to any additional documentation files and/or dependencies. If the API specification is divided into multiple files and/or stored on different specification repositories 122, the automatic cataloging tool 124 may also gather and assemble these components to generate the API specification. For example, automatic cataloging tool 124 may assemble a plurality of files corresponding to the API specification. These plurality of files may be stored on a plurality of specification repositories 122. The automatic cataloging tool 124 may compare the API specification, the metadata, and/or reference documentation files with the previously published API specification to determine that there has been a change. This process may validate the API specification even when the different API specification components may be stored in different specification repositories 122. In some embodiments, the validation may be optional.

Upon determining that a change to an API specification has been saved and/or committed, the automatic cataloging tool 124 interfaces with the application exchange system 110 via exchange interface 126 to provide the updated API specification for publication. Exchange interface 126A may transmit the updated API specification with an updated version number to API cataloging service 112. In some embodiments, exchange interface 126 may transmit an updated API specification to replace an existing published API specification. The updated version number may replace the previous version number as well. In some embodiments, exchange interface 126 may transmit the updated and/or edited portions of the updated API specification. API cataloging service 112 may store the updated API specification on application database 114. API cataloging service 112 may also published the updated API specification to an application exchange platform provided by application exchange system 110.

While the automatic cataloging tool 124 may analyze the updated API specification at API development system 120, in some embodiments, API cataloging service 112 may perform the analysis. For example, a potentially updated API specification may be committed and/or deployed at API development system 120. Exchange interface 126 may automatically notify application exchange system 110 of this update and/or provide the updated API specification. API cataloging service 112 may validate the updated API specification to determine whether a change has been made prior to publishing the updated API specification.

In some embodiments, application exchange system 110 may interface with API development systems 120 corresponding to the same organization or enterprise system and/or corresponding to different organizations or enterprise systems. When receiving updated API specifications from different API development systems 120, application exchange system 110 may format and/or present the different API specifications on the application exchange platform for users to view.

This may occur even when different API development systems 120 use different API development formats. For example, API development system 120A may use a GitHub platform to define an API and/or an API specification. API development system 120n may use local files and/or a different formatting structure. The automatic cataloging tool 124 implemented at API development systems 120A, 120n, however, is still configured to analyze updated API specifications and provide the updated API specifications to application exchange system 110. In this manner, the automatic cataloging tool 124 may be implemented into different API development systems 120 using different documentation and/or API development formats. Application exchange system 110 is still able to receive updated API specifications and/or version numbers from the automatic cataloging tools 124 deployed at each API development system 120. Application exchange system 110 is then able to publish these updated API specifications within its application exchange for public access.

Figure 2:
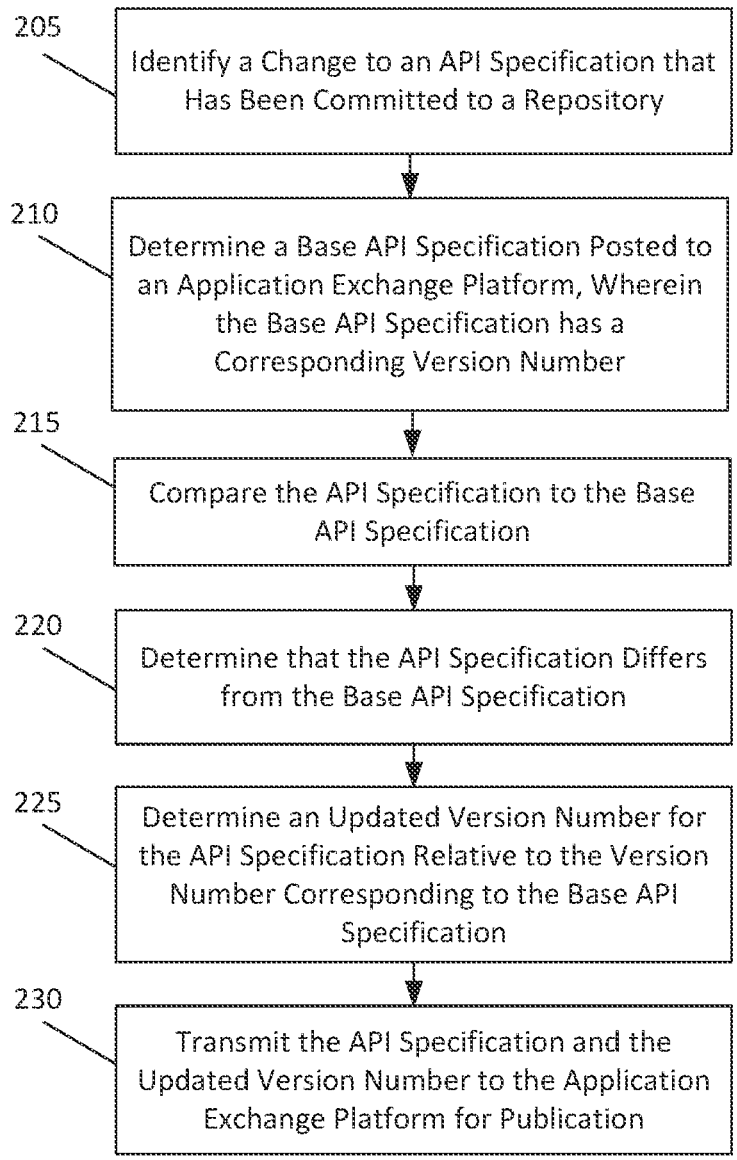
FIG. 2 depicts a flowchart illustrating a method for cataloging an API specification with a version number at an API development system, according to some embodiments.

FIG. 2 depicts a flowchart illustrating a method 200 for cataloging an API specification with a version number at an API development system 120, according to some embodiments. Method 200 shall be described with reference to FIG. 1; however, method 200 is not limited to that example embodiment.

In an embodiment, automatic cataloging tool 124 may utilize method 200 to identify updated API specification and updated version number. The foregoing description will describe an embodiment of the execution of method 200 with respect to automatic cataloging tool 124. While method 200 is described with reference to automatic cataloging tool 124, method 200 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

At 205, automatic cataloging tool 124 may identify a change to an API specification that has been committed to a repository. The repository may be specification repository 122. Automatic cataloging tool 124 may identify an updated API specification that has been committed to the specification repository 122. As previously explained, automatic cataloging tool 124 may identify a change to the API specification based on one or more triggering conditions. These one or more of these triggering conditions may allow automatic cataloging tool 124 to define dynamic rules for publishing updated API specifications. These rules may be based on the reading of a descriptor file, reading a commit comment, identifying a commit branch, identifying a commit owner, and/or identifying a particular time to commit the updated API specification. For example, similar to what was explained previously, automatic cataloging tool 124 may read a comment or commit comment within an API specification committed to specification repository 122. This comment may be a string of characters indicating that the saved API specification is to be published. The string of characters may be at the start of the API specification and/or elsewhere in the API specification. Reading this comment by the automatic cataloging tool 124 triggers a publication process.

In some embodiments, a specific API development branch may be designated in specification repository 122. This may be a master branch, a commit branch, and/or a publication branch. When the updated API specification is committed to this branch, automatic cataloging tool 124 may trigger the publication process. In some embodiments, automatic cataloging tool 124 may ignore changes committed to other branches. As previously explained, automatic cataloging tool 124 may also trigger based on other conditions such as tracking owners of changes that are committed and/or tracking a time period where changes are committed.

In some embodiments, automatic cataloging tool 124 may trigger a check to determine whether an API specification has been updated when an API specification is saved. For example, an API developer may save and/or commit an updated API specification using a GUI data object on the API developer's client device. For example, a GUI data object corresponding to the API documentation platform or a GUI data object specific to the automatic cataloging tool 124 may be selected to commit an updated API specification. When either GUI data object is selected, automatic cataloging tool 124 may identify the saved API specification for comparison with the one or more triggering conditions. In some embodiments, automatic cataloging tool 124 may perform a check to identify when a an updated API specification when an API development pipeline is run. Automatic cataloging tool 124 may automatically discover changes to the API specification during the execution of the pipeline.

At 210, automatic cataloging tool 124 may determine a base API specification posted to an application exchange platform, wherein the base API specification has a corresponding version number. As previously explained, the application exchange platform may be provided by application exchange system 110. Method 300A as further described with reference to FIG. 3A described an embodiment of determining the base API specification. This identification may be performed using a wildcard syntax to identify the relevant portions of the base API specification that are matching. The determination of the base API specification may aid developers when there are multiple versions of an API and/or an API specification that have been published and are still supported. For example, a version 1.0 and a version 2.0 of an API may both still be supported and in use. The base API specification may correspond to the particular branch of API development that is being updated. For example, automatic cataloging tool 124 may identify a base API specification from the version 1.0 branch or the version 2.0 branch. In some embodiments, the base API specification may be the most recent version within the particular branch identified. This is further explained with reference to FIG. 3A. By selecting a particular branch in this manner, automatic cataloging tool 124 may update the appropriate API specification without clashing and/or disrupting API specifications for other branches.

At 215, automatic cataloging tool 124 may compare the API specification to the base API specification. For example, automatic cataloging tool 124 may compare the content of the API specification committed to specification repository 122 to the content of the base API specification determine if the content differs. The base API specification may also include corresponding metadata and/or other documentation files. This comparison may determine whether the updated API specification, metadata, and/or other documentation files have changed relative to the base API specification posted on the application exchange platform. When comparing documentation files, automatic cataloging tool 124 may compare a first file referenced in the API specification with a second file referenced in the base API specification. The first file may be an updated version of the second file. When the first and second file differ, automatic cataloging tool 124 may designate the updated API specification as differing from the base API specification. In some embodiments, this comparison may be performed by hashing the API specifications, metadata, and/or other documentation files and comparing the resulting hashes to determine if a difference exists. For example, automatic cataloging tool 124 may receive a hash of the base API specification for comparison. In some embodiments, automatic cataloging tool 124 may also cache the received hash string and/or the hash generated for the updated API specification. This may be used for future comparison of subsequent updates to the API specification.

At 220, automatic cataloging tool 124 may determine that the API specification differs from the base API specification. This difference may indicate that an updated API specification has been committed. If the content of the API specification, metadata, and/or other documentation files have changed, this may indicate that the base API specification should be updated. Updating the API specification content, metadata, and/or other documentation files may provide the public with an updated API specification for implementing an API corresponding to API development system 120. In some embodiments, this determination may correspond to a validation that the API specification has changed. This validation may be confirmed based on a change of the API specification content, the metadata, and/or the other documentation files referenced in the API specification. This validation may also validate dependencies and/or a tree of dependencies. If a dependency has changed, automatic cataloging tool 124 may also recognize this change as a difference in the API specification. For example, automatic cataloging tool 124 may determine that a file from a plurality of files forming the dependency has changed. Automatic cataloging tool 124 may identify this change in the updated API specification. This change will also be reflected when the API specification is updated on the application exchange platform.

At 225, automatic cataloging tool 124 may determine an updated version number for the API specification relative to the version number corresponding to the base API specification. A process for determining the updated version number is further described with reference to FIG. 3B. The determination of the updated version number may occur prior to or after determining that the API specification differs from the base API specification. When determining the updated version number, automatic cataloging tool 124 may receive and/or determine a type of change that has been committed. For example, this type of change may be a patch update, a minor update, and/or a major update. These changes may correspond to different digits being incremented of the base API version number. In some embodiments, to determine the severity of the change, automatic cataloging tool 124 may use a semantic analysis as previously described to determine the updated version number.

At 230 automatic cataloging tool 124 may transmit the API specification and the updated version number to the application exchange platform for publication. Automatic cataloging tool 124 may transmit this data from exchange interface 126 to API cataloging service 112 via network 140. In some embodiments, automatic cataloging tool 124 may package the API specification and the updated version number with metadata and/or other documentation files. In some embodiments, instead of packaging the API specification content with metadata and/or other documentation files, automatic cataloging tool may transmit the portions of the API specification, metadata, and/or other documentation files that have changed. In this case, application exchange system 110 may publish the changed subject matter.

Figure 3A:
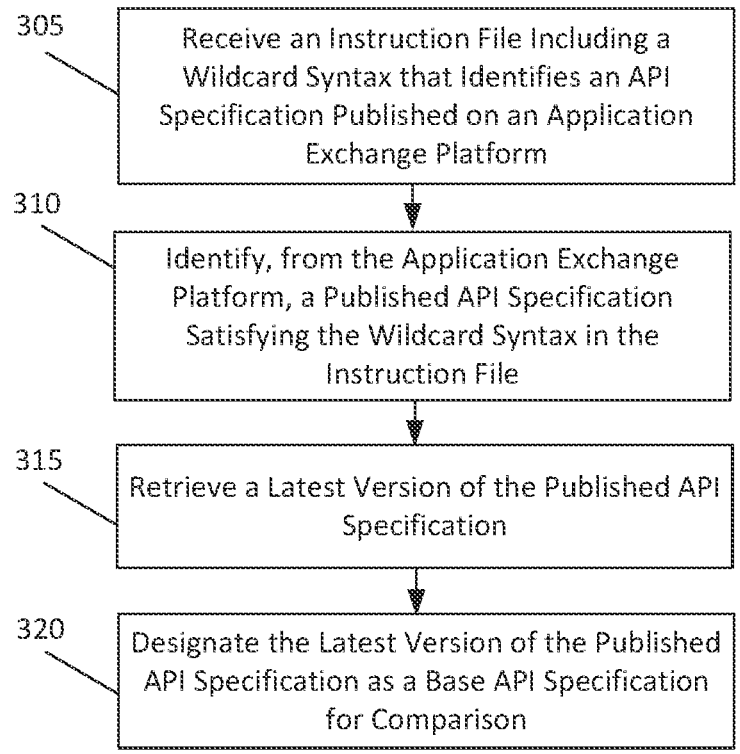
FIG. 3A depicts a flowchart illustrating a method for determining a base API specification, according to some embodiments.

FIG. 3A depicts a flowchart illustrating a method 300A for determining a base API specification, according to some embodiments. Method 300A shall be described with reference to FIG. 1; however, method 300A is not limited to that example embodiment.

In an embodiment, automatic cataloging tool 124 may utilize method 300A to determine a base API specification from an application exchange platform. The foregoing description will describe an embodiment of the execution of method 300A with respect to automatic cataloging tool 124. While method 300A is described with reference to automatic cataloging tool 124, method 300A may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3A, as will be understood by a person of ordinary skill in the art.

At 305, automatic cataloging tool 124 may receive an instruction file including a wildcard syntax that identifies an API specification published on an application exchange platform. In some embodiments, a developer using API development system 120 may provide the instruction file as a separate file to automatic cataloging tool 124. For example, the developer may draft a document file including wildcard syntax and provide this document file to automatic cataloging tool 124. In some embodiments, automatic cataloging tool 124 may include a console and/or generate a GUI allowing a user to draft the instruction file. For example, the developer may be presented with a version of a previous API specification. The developer may then provide in-line edits to provide the wildcard designations. These wildcard designations may identify non-matching portions of a previously published API specification. Automatic cataloging tool 124 may ignore these portions when searching for a matching published API specification.

For example, the wildcard syntax may define one or more patterns for automatic cataloging tool 124 to use when identifying the base API specification. For example, the wildcard syntax may include wildcards as well as portions of the base API specification that are intended to match portions from the updated API specification. The wildcards provided in the instruction file may indicate non-matching portions of the base API specification. These non-matching portions may be skipped when automatic cataloging tool 124 searches for the base API specification. With the wildcard syntax, automatic cataloging tool 124 may recognize the matching portions corresponding to the desired base API specification. This may be a particular branch of API development. Automatic cataloging tool 124 may identify an identified API specification as the base API specification. As will be further explained below, automatic cataloging tool 124 may retrieve a latest version of the API specification within the particular API development branch matching the wildcard syntax. This may occur, for example, if multiple matching API specifications are identified that match the wildcard syntax.

At 310, automatic cataloging tool 124 may identify, from the application exchange platform, a published API specification satisfying the wildcard syntax in the instruction file. In some embodiments, automatic cataloging tool 124 may perform a search of the application exchange platform. In some embodiments, automatic cataloging tool 124 may transmit the instruction file to application exchange system 110 to perform the searching. Automatic cataloging tool 124 may generate the instruction file if a developer has defined the wildcard syntax using a console provided by automatic cataloging tool 124. In some embodiments, as previously explained, multiple published API specification may match the wildcard syntax. This may happen, for example, when multiple API specifications have been published for a particular branch. In some embodiments, automatic cataloging tool 124 may present these multiple API specifications on a GUI for developer use to specify the particular published API specification to use as the base API specification. In some embodiments, automatic cataloging tool 124 may identify the latest version of the published API specification as being the base API specification.

At 315, automatic cataloging tool 124 may retrieve the latest version of the published API specification. The latest version may be the most recent version of the published API specification. At 320, automatic cataloging tool 124 may designate the latest version of the published API specification as a base API specification for comparison. This comparison may occur as described at 215 with reference to FIG. 2. In some embodiments, automatic cataloging tool 124 may cache the retrieved base API specification for later comparison. By using the wildcard syntax in this manner, automatic cataloging tool 124 may avoid disruption or clashing between different versions of an API specification.

Figure 3B:
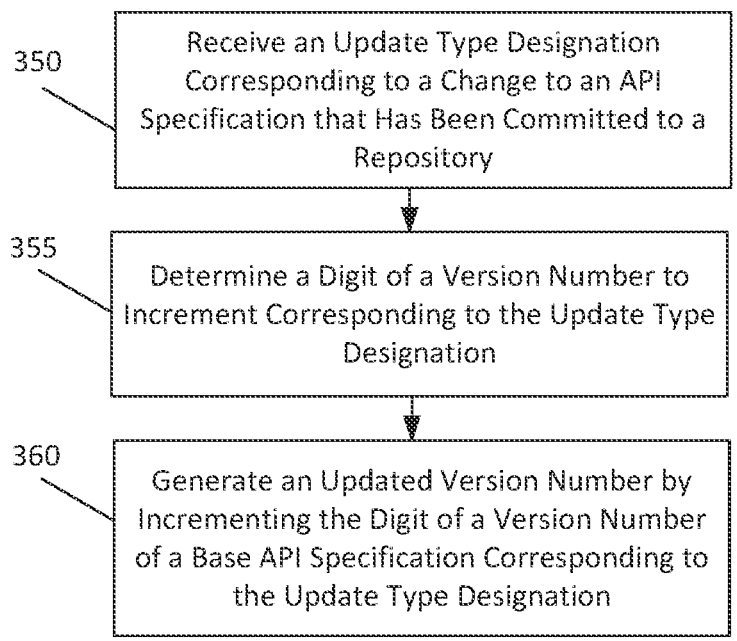
FIG. 3B depicts a flowchart illustrating a method for determining a version number, according to some embodiments.

FIG. 3B depicts a flowchart illustrating a method 300B for determining a version number, according to some embodiments. Method 300B shall be described with reference to FIG. 1; however, method 300B is not limited to that example embodiment.

In an embodiment, automatic cataloging tool 124 may utilize method 300B to determine an updated version number corresponding to an updated API specification. The foregoing description will describe an embodiment of the execution of method 300B with respect to automatic cataloging tool 124. While method 300B is described with reference to automatic cataloging tool 124, method 300B may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3B, as will be understood by a person of ordinary skill in the art.

At 350, automatic cataloging tool 124 may receive an update type designation corresponding to a change to an API specification that has been committed to a repository. The change may be the change to the API specification described with reference to 205 and FIG. 2. For example, a developer providing the updated API specification may specify and/or designate the type of update being submitted. In some embodiments, when automatic cataloging tool 124 identifies the change that has been committed to specification repository 122, automatic cataloging tool 124 may also receive an update type designation corresponding to the change. This may be a designation within the updated API specification and/or specified by a developer in a console or GUI accessible by automatic cataloging tool 124.

As previously explained, the update type designation may correspond to categories indicating a severity of the changes or updates to the API specification. Categories of updates may include a patch update, a minor update, and/or a major update. In some embodiments, the developer may identify the severity and/or the update type designation. In some embodiments, automatic cataloging tool 124 may perform a semantic analysis to determine the update type designation. Automatic cataloging tool 124 may determine the types of changes introduced to the API specification. For example, if the change renders the previous API implementation unusable or breaks the API implementation, such as when an existing endpoint is removed, then automatic cataloging tool 124 may designate the change as a major update. In this manner, automatic cataloging tool 124 may determine the update type designation and/or the version number based on a degree of change and/or a severity of change.

At 355, automatic cataloging tool 124 may determine a digit of a version number to increment corresponding to the update type designation. For example, automatic cataloging tool 124 may have determined a base API specification with a corresponding version number. The version number corresponding to the base API specification may include one or more digits. Depending on the update type designation identified at 350, automatic cataloging tool 124 may determine the particular digit of the version number to increment. For example, the version number of the base API specification may be 5.2.0. Automatic cataloging tool 124 may associate each of these digits with a corresponding update type designation. For example, a major update may correspond to the "5" digit; a minor update may correspond to the "2" digit; and a patch update may correspond to the "0" digit. In this case, at 355, automatic cataloging tool 124 determines which digit of the base API specification should be incremented based on the update type designation.

At 360, automatic cataloging tool 124 may generate an updated version number by incrementing the digit of a version number of a base API specification corresponding to the update type designation. This updated version number may be used and/or provided with the updated API specification to the application exchange platform as described at 225 and 230 of FIG. 2. When generating the updated version number, automatic cataloging tool 124 may increment a digit. For example, for a patch update, the version number "5.2.1" may be incremented to "5.2.2". In some embodiments, when other digits are incremented, for example, for a major or minor update, the other digits may be reset to "0". For example, for a minor update to version number "5.2.1", automatic cataloging tool 124 may generate the version number "5.3.0". Similarly, for a major update, automatic cataloging tool 124 may generate version number "6.0.0".

This updated version number may then be transmitted to application exchange system 110 for publication with the updated API specification.

Figure 4:
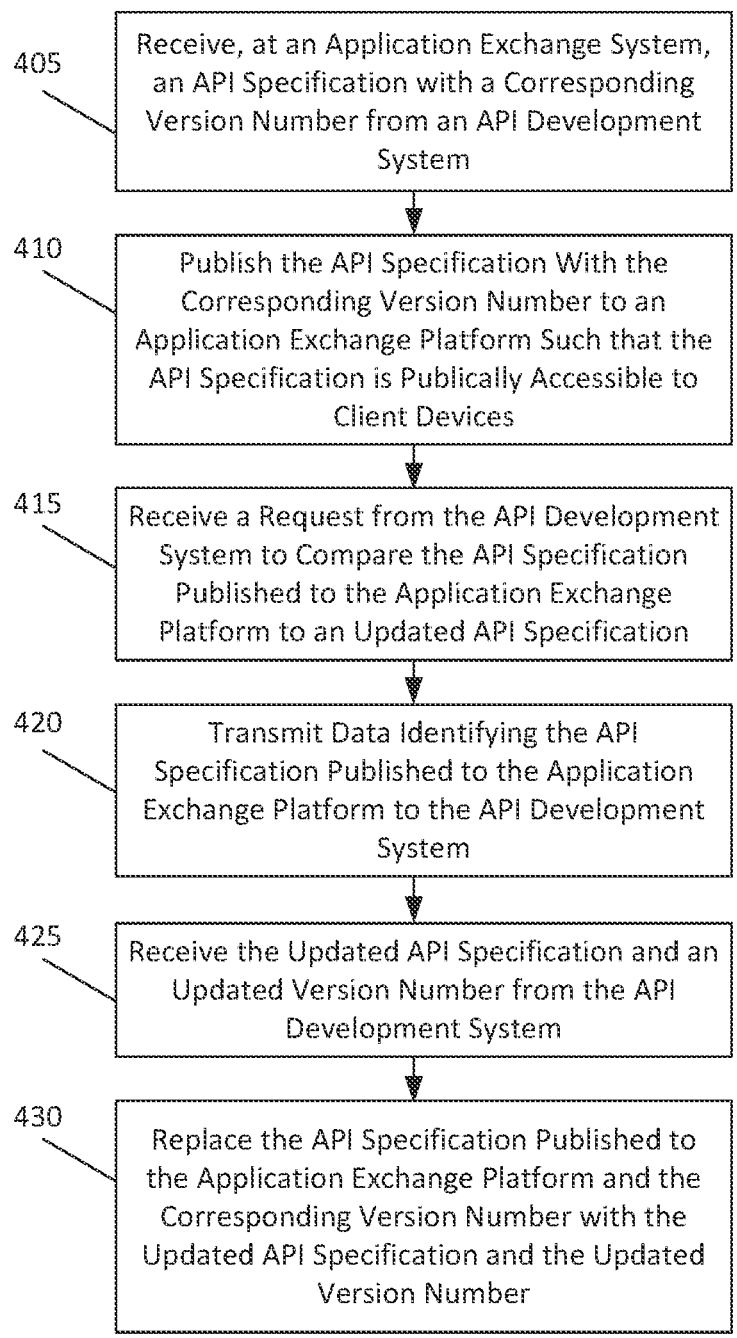
FIG. 4 depicts a flowchart illustrating a method for cataloging an API specification with a version number at an application exchange platform, according to some embodiments.

FIG. 4 depicts a flowchart illustrating a method 400 for cataloging an API specification with a version number at an application exchange platform, according to some embodiments. Method 400 shall be described with reference to FIG. 1; however, method 400 is not limited to that example embodiment.

In an embodiment, application exchange system 110 may utilize method 400 to update API specifications and/or corresponding version numbers. The foregoing description will describe an embodiment of the execution of method 400 with respect to application exchange system 110. While method 400 is described with reference to application exchange system 110, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, application exchange system 110 may receive an API specification with a corresponding version number from an API development system 120. Application exchange system 110 may receive the API specification via API cataloging service 112. The API specification may include content of the API specification, metadata, and/or other documentation files referenced in the API specification. The version number may be provided by API development system 120. In some embodiments, application exchange system 110 may derive the version number based on previously submitted API specifications.

At 410, application exchange system 110 may publish the API specification with the corresponding version number to an application exchange platform such that the API specification is publically accessible to client devices. For example, application exchange system 110 may provide an application exchange platform allowing users to browse applications, APIs, and/or API specifications. Client devices may be user devices 130. Publishing the API specification may allow a user device 130 to access and/or view the API specification. User devices 130 may also view the corresponding version numbers. In some embodiments, application exchange system 110 may also facilitate the installation and/or use of the corresponding API.

At 415, application exchange system 110 may receive a request from the API development system 120 to compare the API specification published to the application exchange platform to an updated API specification. In some embodiments, the request may be for application exchange system 110 to provide application development system 120 with the API specification, metadata, and/or other documentation files previously published. In this case, application exchange system 110 may provide this data to API development system 120. API development system 120 may then analyze an API specification to determine whether it has been updated or changed. API development system 120 may perform the validation of the API specification as described with reference to 215 and FIG. 2.

In some embodiments, application exchange system 110 may receive an instruction file including a wildcard syntax that identifies the published API specification. Application exchange system 110 may receive this instruction file from automatic cataloging tool 124. In this, application exchange system 110 may perform a comparison of published API specifications to the wildcard syntax to identify a matching API specification. This may include API specification content, metadata, and/or other documentation files. In some embodiments, automatic cataloging tool 124 may be used to browse and/or search application exchange system 110 for the particular published API specification matching the wildcard syntax. In some embodiments, the identified published API specification may be the most recent version of an API specification that matches the wildcard syntax. This may be the base API specification used by automatic cataloging tool 124 as previously described in FIGS. 2, 3A, and 3B.

At 420, application exchange system 110 may transmit data identifying the API specification published to the application exchange platform the API development system 120. In some embodiments, application exchange system 110 may transmit the published API specification to the API development system 120 to perform a comparison. In some embodiments, application exchange system 110 may transmit a hash representation of the published API specification. This hash representation may be generated by applying a hash algorithm to the content of the published API specification to generate a hash string. Automatic cataloging tool 124 may apply the same hash algorithm to the updated API specification to generate another hash string for comparison. If these hash strings differ, automatic cataloging tool 124 may determine that the update API specification differs from the one previously published. Automatic cataloging tool 124 may then transmit the updated API specification to application exchange system 110. If the hash strings are the same, automatic cataloging tool 124 may determine that no change has occurred and may not transmit the updated API specification. In some embodiments, application exchange system 110 may receive the hash value from automatic cataloging tool 124. Application exchange system 110 may then compare the hash values. Application exchange system 110 may indicate to the API development system 120 whether the hash values match.

At 425, application exchange system 110 may receive the updated API specification and an updated version number from the API development system 120. This may occur similar to the receiving at 405. In some embodiments, application exchange system 110 may transmit a message to API development system 120 to retrieve the updated API specification content, metadata, and/or other document files. In some embodiments, application exchange system 110 may be set to receive the updated API specification based on a determination at the API development system 120 that the API specifications differ. Similarly, API development system 120 may determine the updated version number and transmit this updated version number to application exchange system 110. In some embodiments, API development system 120 may transmit data to application exchange system 110 such that application exchange system 110 derives the updated version number. This data may be the update type designation described with reference to FIG. 3B.

At 430, application exchange system 110 may replace the API specification published to the application exchange platform and the corresponding version number with the updated API specification and the updated version number. In some embodiments, application exchange system 110 may remove the old API specification. In some embodiments, application exchange system 110 may provide a changelog and/or identify the changes implemented with the updated API specification. These changes and/or an indication of these changes may be viewed by the client devices when viewing the application exchange platform. Application exchange system 110 may modify the application exchange platform to display, indicate, and/or highlight the changes. Application exchange system 110 may or may not allow users to view old versions of the API specification. Application exchange system 110 may display the updated version number with the updated API specification.

Figure 5:
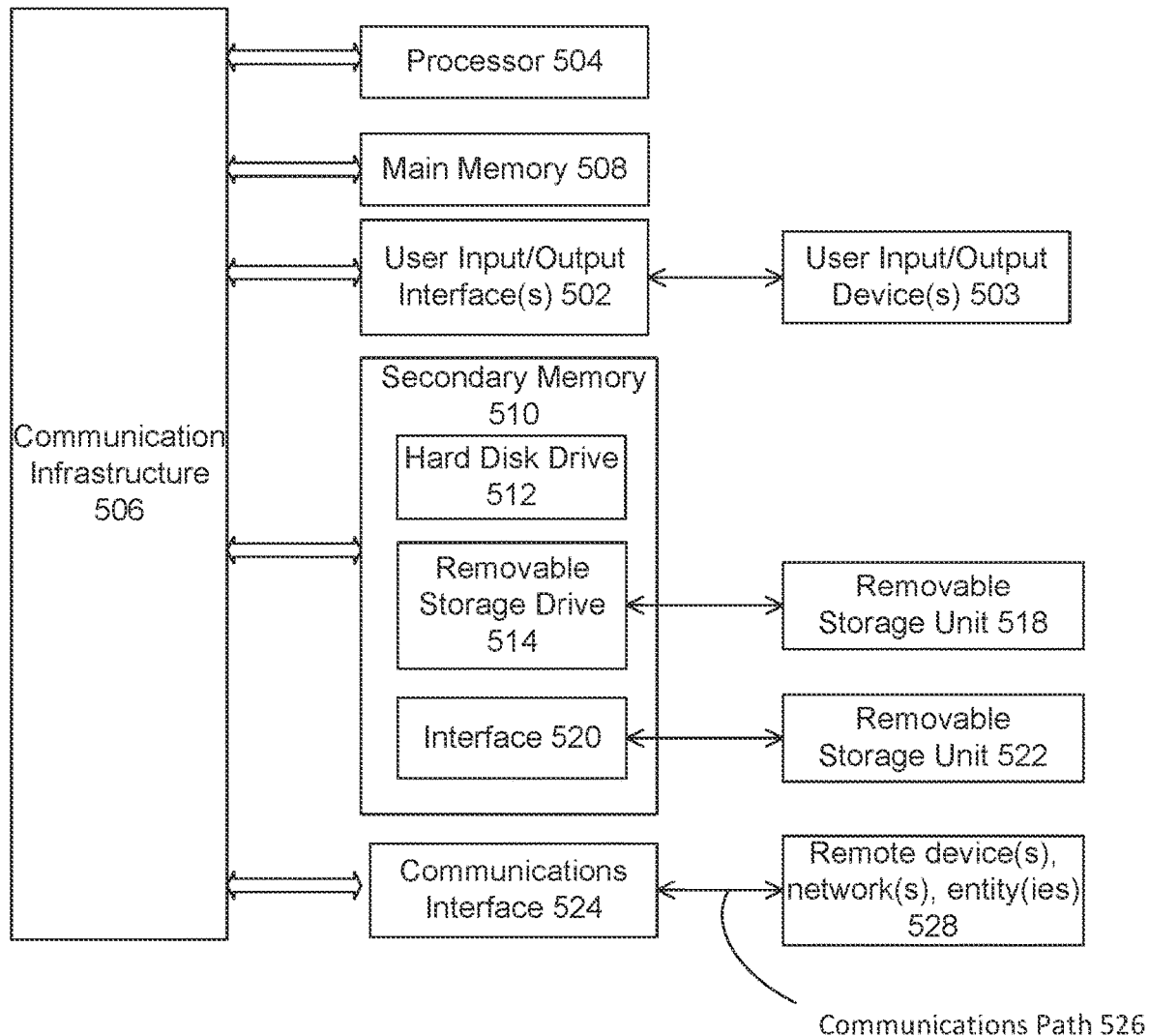
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a CPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring; to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   identifying, by an automatic cataloging tool installed at an Application Programming Interface (API) development system, an updated API specification that has been committed to an API specification repository;
   determining, by the automatic cataloging tool, a base API specification posted to an application exchange platform, wherein the base API specification has a corresponding version number;
   comparing, by the automatic cataloging tool, the updated API specification to the base API specification;
   determining, by the automatic cataloging tool, that the updated API specification differs from the base API specification;
   determining, by the automatic cataloging tool, an updated version number for the updated API specification relative to the version number corresponding to the base API specification; and
   transmitting, by the automatic cataloging tool, the updated API specification and the updated version number to the application exchange platform for publication.

2. The method of claim 1, wherein determining the base API specification further comprises:
   receiving, at the automatic cataloging tool, an instruction file including a wildcard syntax that identifies a published API specification on the application exchange platform;
   identifying, by the automatic cataloging tool and from the application exchange platform, a published API specification satisfying the wildcard syntax in the instruction file; and
   designating, by the automatic cataloging tool, the published API specification as the base API specification.

3. The method of claim 1, wherein determining the base API specification further comprises:
   receiving, at the automatic cataloging tool, an instruction file including a wildcard syntax that identifies a published API specification on the application exchange platform;
   identifying, by the automatic cataloging tool and from the application exchange platform, a published API specification satisfying the wildcard syntax in the instruction file;
   retrieving, by the automatic cataloging tool, a latest version of the published API specification; and
   designating, by the automatic cataloging tool, the latest version of the published API specification as the base API specification.

4. The method of claim 1, wherein identifying the updated API specification further comprises:
   reading, by the automatic cataloging tool, a comment string in the updated API specification triggering publication of the updated API specification.

5. The method of claim 1, wherein identifying the updated API specification further comprises:
   identifying, by the automatic cataloging tool, a plurality of API branches stored at the API specification repository; and
   determining, by the automatic cataloging tool, that the updated API specification has been committed to a branch from the plurality of API branches designated for publication to the application exchange platform.

6. The method of claim 1, wherein determining the updated version number further comprises:
   receiving, by the automatic cataloging tool, an update type designation corresponding to the updated API specification that has been committed to the API specification repository;
   determining, by the automatic cataloging tool, a digit of a version number to increment corresponding to the update type designation; and
   generating, by the automatic cataloging tool, the updated version number by incrementing the digit of the version number corresponding to the base API specification.

7. The method of claim 6, wherein receiving the update type designation further comprises:

receiving, by the automatic cataloging tool, a selection from a versioning group including a patch update, a minor update, and a major update.

8. The method of claim 6, wherein receiving the update type designation further comprises:
receiving, by the automatic cataloging tool, an indication to perform a semantic analysis to determine a type of change introduced in the updated API specification relative to the base API specification;
performing, by the automatic cataloging tool, the semantic analysis to determine the type of change; and
setting, by the automatic cataloging tool, the type of change determined from the semantic analysis as the update type designation.

9. A non-transitory machine-readable storage medium that provides instructions that, if executed by a processor, are configurable to cause said processor to perform operations comprising:
identifying, by an automatic cataloging tool installed at an Application Programming Interface (API) development system, an updated API specification that has been committed to an API specification repository;
determining, by the automatic cataloging tool, a base API specification posted to an application exchange platform, wherein the base API specification has a corresponding version number;
comparing, by the automatic cataloging tool, the updated API specification to the base API specification;
determining, by the automatic cataloging tool, that the updated API specification differs from the base API specification;
determining, by the automatic cataloging tool, an updated version number for the updated API specification relative to the version number corresponding to the base API specification; and
transmitting, by the automatic cataloging tool, the updated API specification and the updated version number to the application exchange platform for publication.

10. The non-transitory machine-readable storage medium of claim 9, wherein determining the base API specification further comprises:
receiving, at the automatic cataloging tool, an instruction file including a wildcard syntax that identifies a published API specification on the application exchange platform;
identifying, by the automatic cataloging tool and from the application exchange platform, a published API specification satisfying the wildcard syntax in the instruction file; and
designating, by the automatic cataloging tool, the published API specification as the base API specification.

11. The non-transitory machine-readable storage medium of claim 9, wherein determining the base API specification further comprises:
receiving, at the automatic cataloging tool, an instruction file including a wildcard syntax that identifies a published API specification on the application exchange platform;
identifying, by the automatic cataloging tool and from the application exchange platform, a published API specification satisfying the wildcard syntax in the instruction file;
retrieving, by the automatic cataloging tool, a latest version of the published API specification; and
designating, by the automatic cataloging tool, the latest version of the published API specification as the base API specification.

12. The non-transitory machine-readable storage medium of claim 9, wherein identifying the updated API specification further comprises:
reading, by the automatic cataloging tool, a comment string in the updated API specification triggering publication of the updated API specification.

13. The non-transitory machine-readable storage medium of claim 9, wherein identifying the updated API specification further comprises:
identifying, by the automatic cataloging tool, a plurality of API branches stored at the API specification repository; and
determining, by the automatic cataloging tool, that the updated API specification has been committed to a branch from the plurality of API branches designated for publication to the application exchange platform.

14. The non-transitory machine-readable storage medium of claim 9, wherein determining the updated version number further comprises:
receiving, by the automatic cataloging tool, an update type designation corresponding to the updated API specification that has been committed to the API specification repository;
determining, by the automatic cataloging tool, a digit of a version number to increment corresponding to the update type designation; and
generating, by the automatic cataloging tool, the updated version number by incrementing the digit of the version number corresponding to the base API specification.

15. The non-transitory machine-readable storage medium of claim 14, wherein receiving the update type designation further comprises:
receiving, by the automatic cataloging tool, a selection from a versioning group including a patch update, a minor update, and a major update.

16. The non-transitory machine-readable storage medium of claim 14, wherein receiving the update type designation further comprises:
receiving, by the automatic cataloging tool, an indication to perform a semantic analysis to determine a type of change introduced in the updated API specification relative to the base API specification;
performing, by the automatic cataloging tool, the semantic analysis to determine the type of change; and
setting, by the automatic cataloging tool, the type of change determined from the semantic analysis as the update type designation.

17. A method, comprising:
receiving an Application Programming Interface (API) specification with a corresponding version number from an API development system;
publishing the API specification with the corresponding version number to an application exchange platform such that the API specification is publically accessible to client devices;
receiving a request from the API development system to compare the API specification published to the application exchange platform to an updated API specification;
transmitting data identifying the API specification published to the application exchange platform to the API development system;
receiving the updated API specification from the API development system and an updated version number; and replacing the API specification published to the application exchange platform and the corresponding version number with the updated API specification and the updated version number.

18. The method of claim 17, wherein the data identifying the API specification is a hash value representing the API specification published to the application exchange platform.

19. The method of claim 17, wherein receiving the request further comprising:
   receiving an instruction file from the API development system including a wildcard syntax that identifies the API specification published to the application exchange platform; and
   identifying the API specification published to the application exchange platform satisfying the wildcard syntax in the instruction file.

20. The method of claim 17, further comprising:
   maintaining, at the application exchange platform, a plurality of branches corresponding an API, wherein the API specification and the updated API specification correspond to a common branch from the plurality of branches.

* * * * *